(12) United States Patent
Tajima et al.

(10) Patent No.: US 10,496,444 B2
(45) Date of Patent: Dec. 3, 2019

(54) COMPUTER AND CONTROL METHOD FOR COMPUTER

(71) Applicant: Hitachi, Ltd., Chiyoda-ku, Tokyo (JP)

(72) Inventors: Sachie Tajima, Tokyo (JP); Masakuni Agetsuma, Tokyo (JP); Takanobu Suzuki, Tokyo (JP); Akihiko Araki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 64 days.

(21) Appl. No.: 15/743,630

(22) PCT Filed: Oct. 2, 2015

(86) PCT No.: PCT/JP2015/078017
§ 371 (c)(1),
(2) Date: Jan. 10, 2018

(87) PCT Pub. No.: WO2017/056310
PCT Pub. Date: Apr. 6, 2017

(65) Prior Publication Data
US 2018/0203733 A1    Jul. 19, 2018

(51) Int. Cl.
*G06F 9/50* (2006.01)
*G06F 12/06* (2006.01)
(Continued)

(52) U.S. Cl.
CPC .......... *G06F 9/5016* (2013.01); *G06F 9/5027* (2013.01); *G06F 12/0646* (2013.01);
(Continued)

(58) Field of Classification Search
CPC ...... G06F 13/28; G06F 12/10; G06F 12/1009; G06F 12/0646
(Continued)

(56) References Cited

U.S. PATENT DOCUMENTS 5,210,852 A     5/1993  Sato
2007/0245041 A1*  10/2007  Hua ................. G06F 13/28
                                                         710/22
(Continued)

FOREIGN PATENT DOCUMENTS

JP      H03-147013 A      6/1991
JP      4808747 B2       11/2008
(Continued)

*Primary Examiner* — Getente A Yimer
(74) *Attorney, Agent, or Firm* — Procopio, Cory, Hargreaves & Savitch LLP

(57) ABSTRACT

By assigning a physically continuous memory area to a virtual storage apparatus operated on an OS, the performance of the virtual storage apparatus is secured. A processor operates an OS, and the processor executes a plurality of processes on the OS. The plurality of processes includes a first virtual storage apparatus. The first virtual storage apparatus executes an I/O process, and includes a cache for storing data that is subjected to the I/O process. The processor assigns a resource in a computer to the plurality of processes, and the processor creates area information that indicates physical addresses assigned to the processes in a memory. On the basis of the area information, the processor selects a continuous area, which is a physically continuous area from the memory and assigns the continuous area to the cache.

9 Claims, 17 Drawing Sheets

(51) Int. Cl.
*G06F 13/28* (2006.01)
*G06F 13/10* (2006.01)

(52) U.S. Cl.
CPC ............... *G06F 13/10* (2013.01); *G06F 13/28* (2013.01); *G06F 2212/1048* (2013.01); *G06F 2212/604* (2013.01); *G06F 2213/2806* (2013.01)

(58) Field of Classification Search
USPC .......................................................... 710/22
See application file for complete search history.

(56) References Cited

U.S. PATENT DOCUMENTS

| | | | | |
|---|---|---|---|---|
| 2008/0126617 A1* | 5/2008 | Brownlow | ............ | G06F 9/4812 710/48 |
| 2008/0126648 A1* | 5/2008 | Brownlow | .............. | G06F 13/24 710/260 |
| 2008/0209130 A1* | 8/2008 | Kegel | ................. | G06F 12/1027 711/135 |
| 2009/0326869 A1 | 12/2009 | Baba | | |
| 2010/0174871 A1* | 7/2010 | Uchida | ................ | G06F 12/0804 711/143 |
| 2011/0022799 A1 | 1/2011 | Sugahara | | |
| 2011/0197019 A1 | 8/2011 | Shingo et al. | | |
| 2014/0068133 A1* | 3/2014 | Tkacik | ................ | G06F 13/1694 710/308 |

FOREIGN PATENT DOCUMENTS

| | | |
|---|---|---|
| JP | 2010-009160 A | 1/2010 |
| JP | 2011-028537 A | 2/2011 |
| JP | 2011-164968 A | 8/2011 |
| JP | 2012-181569 A | 9/2012 |

\* cited by examiner

FIG.8

| Virtual storage ID | Allocated CPU | Allocated non-cache | Allocated cache |
|---|---|---|---|
| Virtual storage A | 50% | 40% | 10% |

Resource allocation configuration table 513

FIG.16

| Physical address | Allocation destination ID | Virtual address | |
|---|---|---|---|
| 100 | Virtual storage A | -- | ~ 1610 |
| 110 | Virtual storage A | -- | |
| 120 | Process X | 0 | ~ 1620 |
| 130 | Process Y | 0 | |
| 140 | Virtual Storage B | -- | |
| 150 | Unallocated | -- | |

1611, 1612, 1613

Memory allocation table 1502

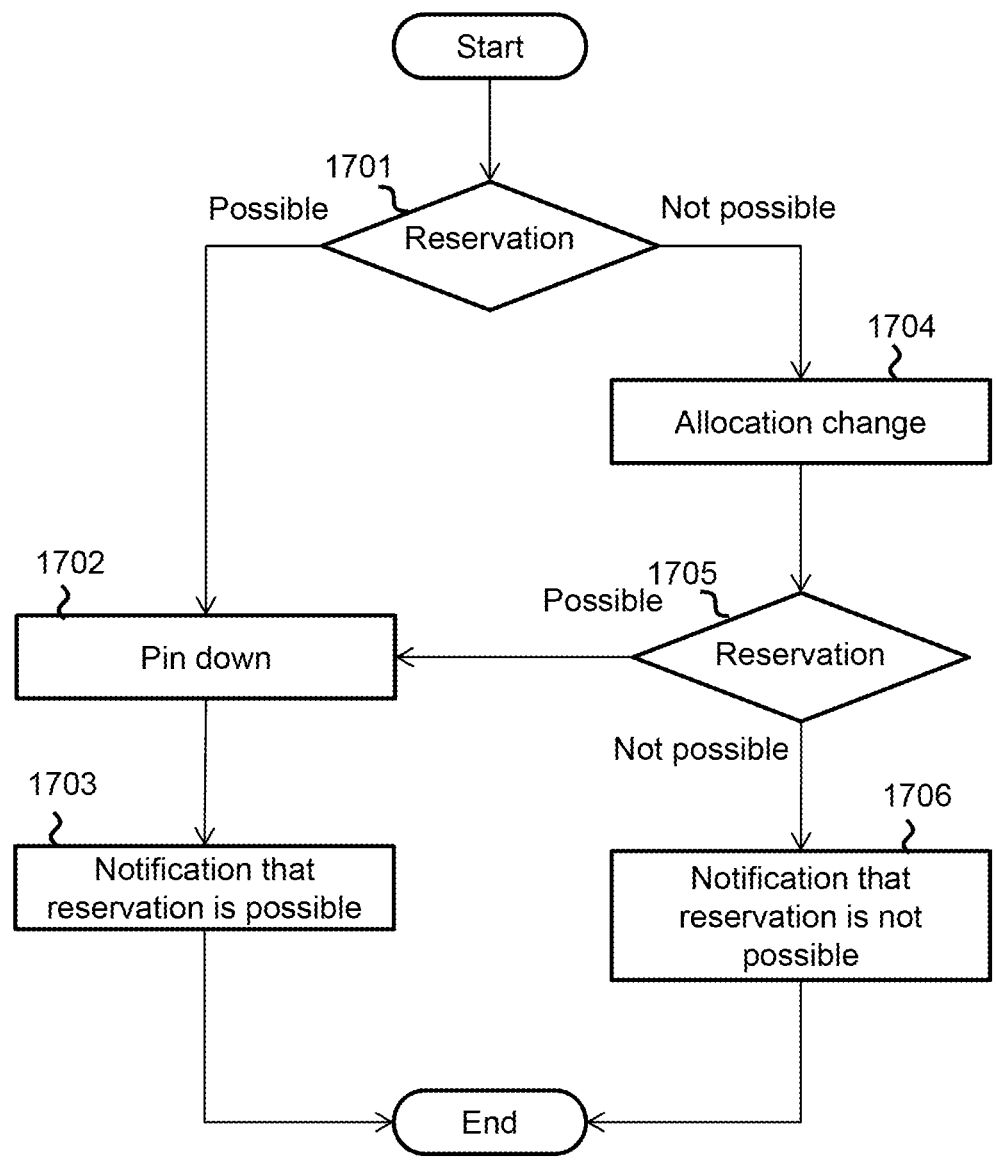

ically contiguous area, from the memory on the basis of the area information, and allocates the contiguous area to the cache.

Advantageous Effects of Invention

By allocating a physically contiguous memory area to a virtual storage apparatus executed on an OS, the performance of the virtual storage apparatus can be secured.

BRIEF DESCRIPTION OF DRAWINGS

FIG. 8 shows a resource allocation configuration table 513 in the client 103.
FIG. 16 shows a memory allocation table 1502.
FIG. 17 shows a reservation process.

DESCRIPTION OF EMBODIMENTS

Figure 1:
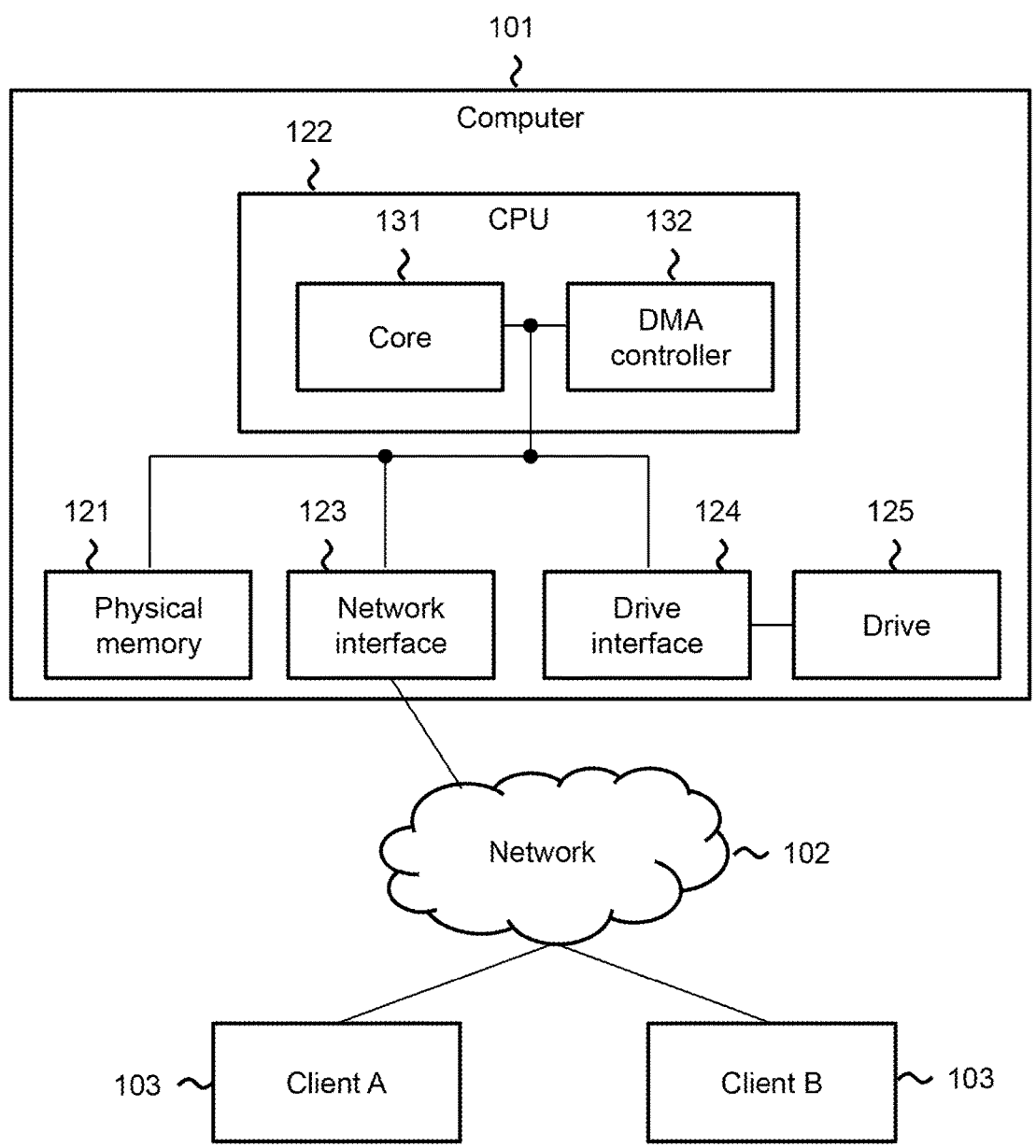
FIG. 1 shows a physical configuration of a computer system according to embodiments of the present invention.

Embodiments of the present invention will be described hereinafter with reference to the drawings.

In the following description, information is explained using the expression "xxx table", however, the information may be expressed by any data structure. In other words, in order to indicate that the information is not dependent on the data structure thereof, "XXX table" can also be referred to as "XXX information". Further, in the following description, the structure of each table is just an example, and one table may be divided into two or more tables, or all or a part of two or more tables may be consolidated into one table.

Further, in the following description, IDs are used as element identification information, however, another type of identification information may be used in place of or in addition thereto.

In addition, in the following description, when elements of the same type are described without making a distinction therebetween, the same reference symbols or a common number within reference symbols may be used for each element and, when elements of the same type are described

COMPUTER AND CONTROL METHOD FOR COMPUTER

CROSS-REFERENCE TO RELATED APPLICATIONS

This application is a U.S. National Stage entry of PCT Application No: PCT/JP2015/078017 filed Oct. 2, 2015, the contents of which are incorporated herein by reference.

TECHNICAL FIELD

The present invention relates to a computer.

BACKGROUND ART

A performance management function for managing the performance of a plurality of tenants in a cloud environment is known. A virtual storage used by tenants is also known.

In general-purpose OSs such as Linux (registered trademark), container technology is known as a technology for controlling resources allocated to processes running on an OS.

PTL 1 is known as a technology for controlling the allocation amount of a memory area allocated to a virtual storage.

CITATION LIST

Patent Literature

[PTL 1]
Japanese Patent No. 4808747

SUMMARY OF INVENTION

Technical Problem

Data transfer performance can be secured by allocating a physically contiguous memory area to a virtual storage.

However, when a virtual storage is executed as a process on a general-purpose OS, memory allocated to the process by the OS is virtual memory, and there is no guarantee that a physical memory area corresponding to a virtual memory area is contiguous.

Therefore, even if resource allocation amount control technology provided by the OS is used, allocation of a physically contiguous memory area cannot be controlled, and the performance of a virtual storage cannot be secured.

With technology such as that of PTL 1, resources allocated to a virtual storage on a general-purpose OS cannot be controlled.

Solution to Problem

In order to solve the problem described above, a computer, that is, one aspect of the present invention, includes a memory, and a processor coupled to the memory. The processor executes an OS, the processor executes a plurality of processes on the OS, the plurality of processes including a first virtual storage apparatus, and the first virtual storage apparatus executing an I/O process and including a cache for storing data subjected to the I/O process, the processor allocates resources in the computer to the plurality of processes, the processor creates area information indicating physical addresses in the memory which are allocated to the processes, and the processor selects a contiguous area, that and a distinction is made therebetween, different reference symbols or, in place of reference symbols, IDs allocated to each element may be used.

Further, in the following description, an I/O (Input/Output) request is a write request or a read request, and may also be referred to an access request.

Moreover, in the following description, there are cases where a process is described with "program" as the subject thereof, however, as a program is executed by a processor (for example, a CPU (Central Processing Section)), whereby a defined process is performed, as appropriate, using a storage resource (a memory, for example) and/or an interface device (a communication port, for example) or the like, the subject of the process may also be the processor. A process described with a program as the subject thereof may be a process or a system performed by a processor or an apparatus which includes a processor. Further, the processor may include a hardware circuit for performing part or all of the process. The program may be installed from a program source onto a apparatus such as a computer. The program source may be, for example, a program distribution server or a storage medium that is readable by a computer. When the program source is a program distribution server, the program distribution server includes a processor (a CPU, for example) and a storage resource, and the storage resource may further store a distribution program and a program to be distributed. The processor of the program distribution server may execute the distribution program so as to distribute the program to be distributed to other computers. In the following description, two or more programs may be realized as one program, or one program may be realized as two or more programs.

Further, in the following description, a management system may include one or more computers. Specifically, for example, when a management computer displays information (specifically, for example, when the management computer displays information on its own display device, or the management computer sends information for display to a remote display computer), the management computer constitutes a management system. Further, for example, when the same function as that of a management computer is realized by a plurality of computers, the plurality of computers (which, when display is performed by a display computer, may include the display computer) constitute a management system. A management computer (management system, for example) may have an interface device coupled to an I/O system that includes a display system, a storage resource (a memory, for example), and a processor coupled to the interface device and the storage resource. A display system may be a display device of the management computer or a display computer coupled to the management computer. An I/O system may be an I/O device (for example, a keyboard and a pointing device or a touch panel) of the management computer, or a display computer or other computer coupled to the management computer. The management computer "displays information for display" indicates that information for display is displayed on a display system, and this may be that information for display is displayed on a display device of the management computer, or that the management computer transmits the information for display to a display computer (in the latter case, the information for display is displayed by the display computer). In addition, input/output of information by the management computer may indicate input/output of information between the management computer and an I/O device of the management computer, or input/output of information between the management computer and a remote computer (a display computer, for example) coupled to the management computer. Output of information may be display of information.

Embodiment 1

The configuration of a computer system according to embodiments of the present invention will be described hereinafter.

FIG. 1 shows a physical configuration of a computer system according to embodiments of the present invention.

The computer system includes one or more computers 101, a network 102, and one or more clients 103.

The computer 101 includes a physical memory 121, a CPU (Central Processing Unit) 122, a network interface 123, a drive interface 124, and a drive 125. The CPU 122 includes a core 131 and a DMA (Direct Memory Access) controller 132. The physical memory 121, the CPU 122, the network interface 123, and the drive interface 124 are interconnected via a bus.

The physical memory 121 stores programs and data. The network interface 123 is coupled to the network 102 and communicates with the clients 103 via the network 102. The drive interface 124 is coupled to the drive 125 and communicates with the drive 125. The drive 125 stores data. The core 131 executes processes in accordance with programs stored in the physical memory 121. The DMA controller 132 performs DMA transfer of data in accordance with an instruction from the core 131. The physical memory 121 may include a plurality of physical memories.

Figure 2:
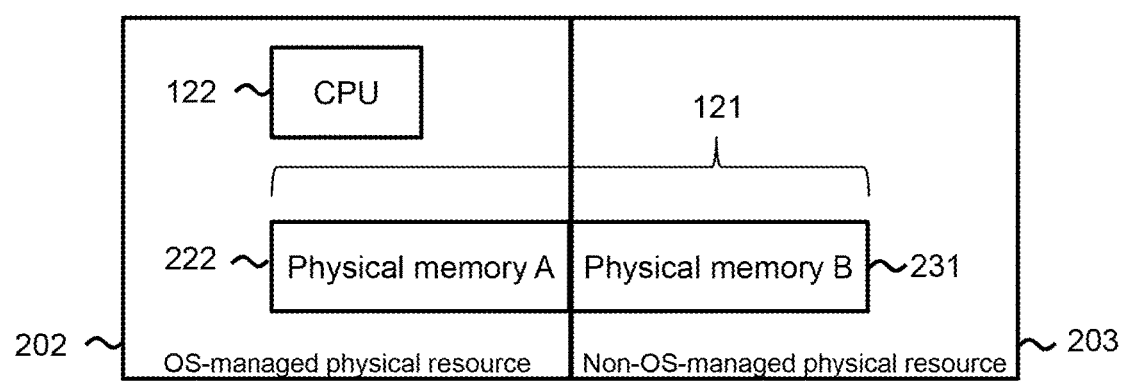
FIG. 2 shows physical resources in a computer 101 according to a first embodiment.

FIG. 2 shows physical resources in the computer 101 according to the first embodiment.

The physical resources in the computer 101 include an OS-managed physical resource 202 which is managed by an OS 201 and a non-OS-managed physical resource 203 which is provided in the computer 101 but is not managed by the OS 201.

The OS-managed physical resource 202 includes the CPU 122 and a physical memory A 222 which is a part of a physical memory 121. The non-OS-managed physical resource 203 includes a physical memory B 231 which is the part of the physical memory 121 that is not included the physical memory A 222.

When activating the OS 201 in the computer 101, a user can configure the OS-managed memory amount, that is, the physical memory amount used by the OS 201, as an OS 201 boot option. The OS-managed memory amount should be equal to or less than the capacity of the physical memory 121. As a result, the physical memory A 222 is an area of the physical memory 121 between the first physical address thereof and the OS-managed memory amount. The physical memory B 231 is an area of the physical memory 121 between a physical address thereof immediately following the area corresponding to the physical memory A 222 and a physical address at the end of the physical memory 121.

By configuring the physical memory A 222 to be the area that is usable by the OS 201, a contiguous area in the physical memory B 231 can be allocated to the cache of a virtual storage without the physical memory B 231 being used by the OS 201.

Figure 3:
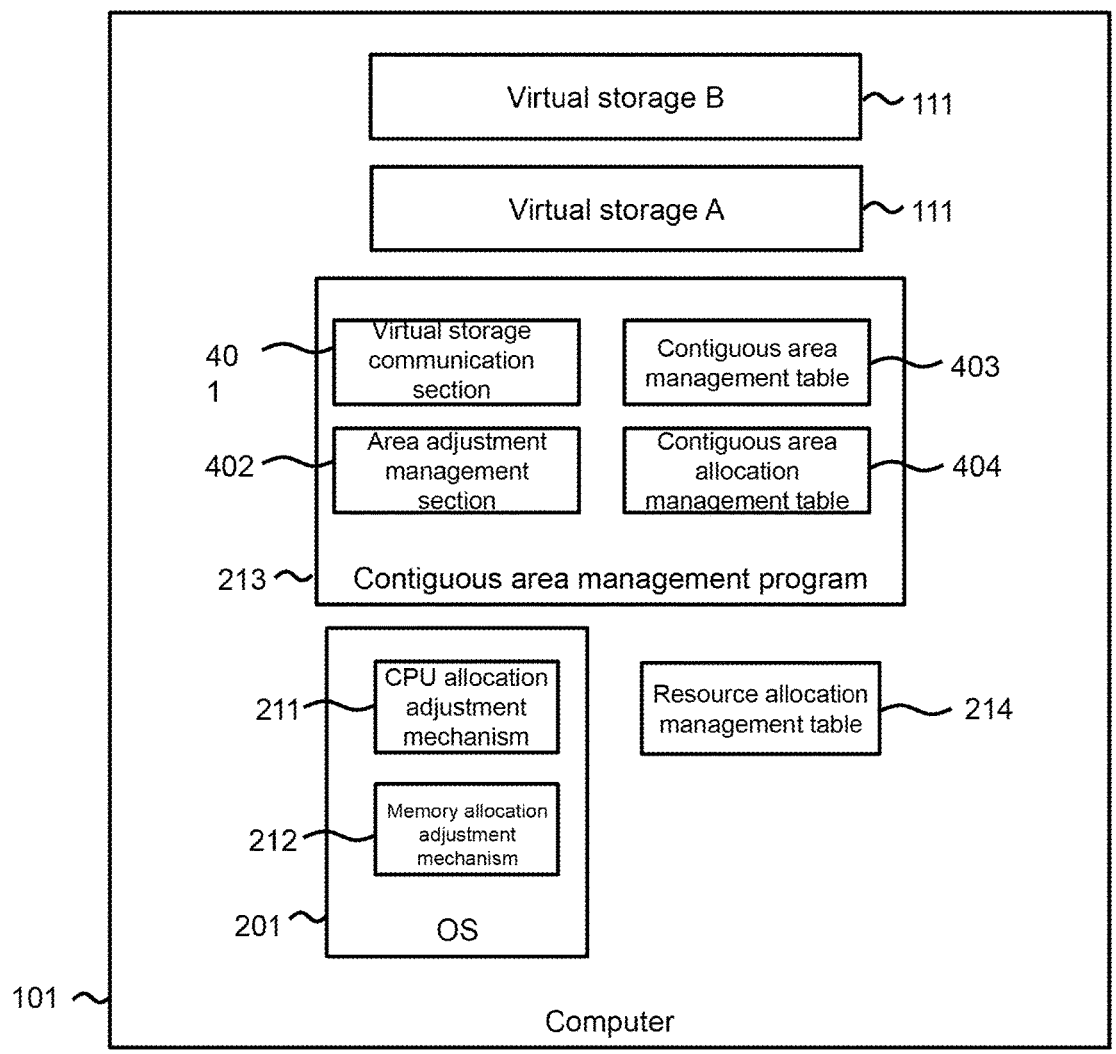
FIG. 3 shows a logical configuration of the computer 101 according to the first embodiment.

FIG. 3 shows a logical configuration of the computer 101 according to the first embodiment.

The logical configuration of the computer 101 includes the OS 201, a contiguous area management program 213, one or more virtual storages (virtual storage apparatus) 111, and a resource allocation management table 214. These are stored in the physical memory 121. Each of the virtual storages 111 is managed as a process by the OS 201. The logical configuration of the computer 101 may include processes other than the virtual storages 111. The OS 201 can use the physical memory A 222. The contiguous area management program 213 can use the physical memory B 231. Note that the contiguous area management program 213 may be included in the OS 201.

The OS 201 builds processes for the virtual storages 111 from the OS-managed physical resource 202 using container technology for integrally managing a plurality of processes. The container technology is a resource division function which includes a CPU allocation adjustment program 211 and a memory allocation adjustment program 212. As long as a technology has such a resource division function, the OS 201 may construct the processes for the virtual storages 111 using a technology other than container technology. The CPU allocation adjustment program 211 allocates resources of the CPU 122 to processes executed on the OS. The memory allocation adjustment program 212 allocates resources of the physical memory A 222 to processes executed on the OS 201. The OS 201 may further include a program or the like for controlling other physical resources of the computer 101.

The contiguous area management program 213 includes a virtual storage communication section 401, an area adjustment management section 402, a contiguous area management table 403, and a contiguous area allocation management table 404. The virtual storage communication section 401 communicates with the virtual storages 111. The area adjustment management section 402 adjusts the areas of the physical memory 121 allocated to the virtual storages 111. The contiguous area management table 403 indicates contiguous areas in the physical memory B 231. The contiguous area allocation management table 404 indicates contiguous areas in the physical memory B 231 allocated to each of the virtual storages.

The resource allocation management table 214 is created by the contiguous area management program 213 and the OS 201, and indicates the allocation status of resources allocated to each of the virtual storages 111.

The computer 101 provides the client 103 with a virtual storage 111. The client 103 controls the one or more of the virtual storages 111.

Figure 4:
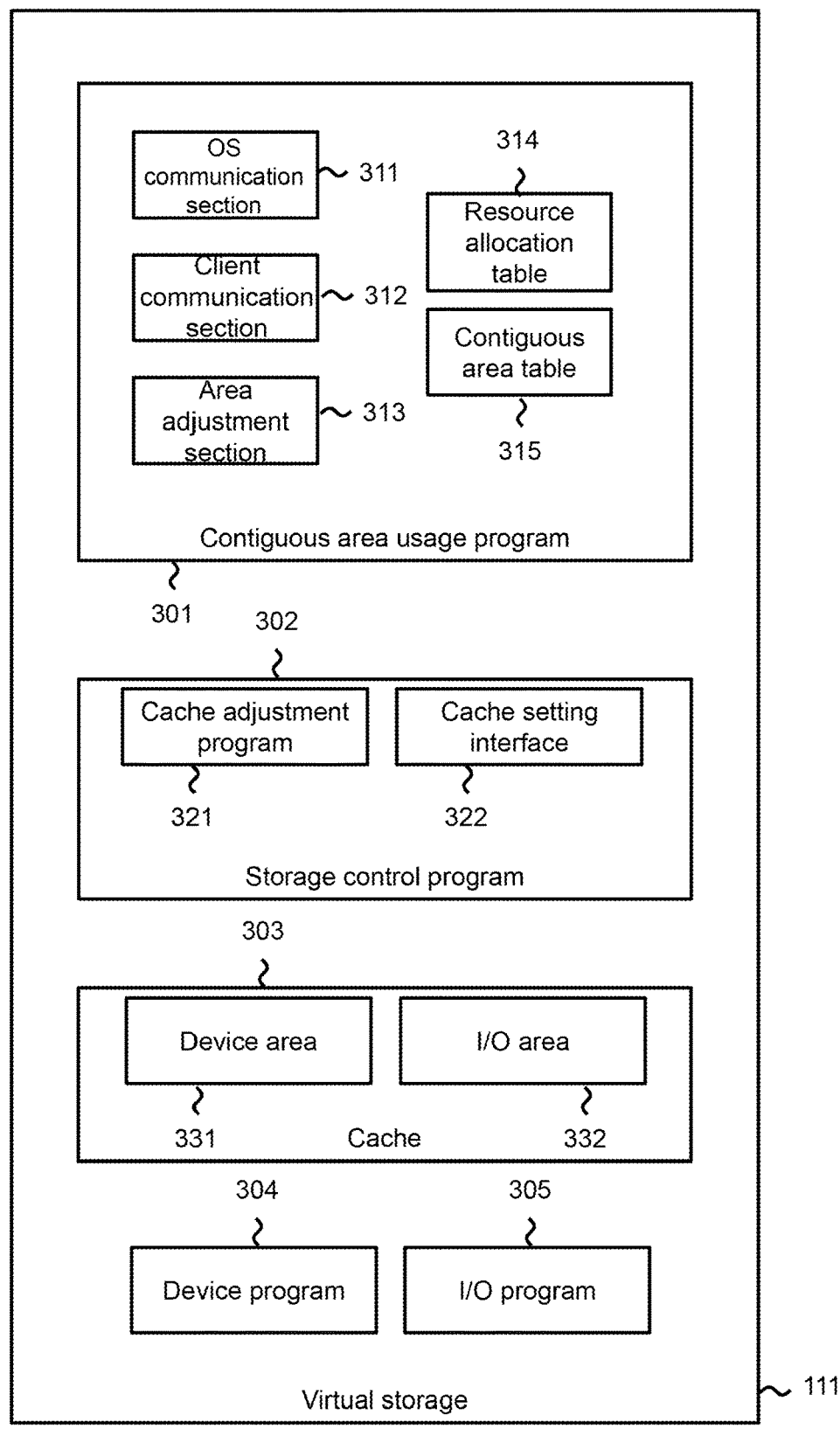
FIG. 4 shows a configuration of a virtual storage 111.

FIG. 4 shows the configuration of a virtual storage 111.

The virtual storage 111 includes a contiguous area usage program 301, a storage control program 302, a cache 303, a device program 304, and an I/O program 305.

The contiguous area usage program 301 includes an OS communication section 311, a client communication section 312, an area adjustment section 313, a resource allocation table 314, and a contiguous area table 315. The OS communication section 311 communicates with the OS 201. The client communication section 312 communicates with the client 103. The area adjustment section 313 manages a cache allocated to the virtual storage. The resource allocation table 314 indicates the allocation status of the resources allocated to the virtual storage. The contiguous area table 315 indicates a contiguous area in the physical memory B 231 allocated to the virtual storage.

The storage control program 302 includes a cache adjustment program 321 and a cache configuration interface 322. The cache adjustment program 321 adjusts the cache 303. The cache configuration interface 322 provides the contiguous area usage program 301 with an interface for adjusting the cache 303.

The device program 304 uses physical devices such as the network interface 123 and the drive interface 124 to create a virtual device having the function of a physical device. The device program 304 may be a device driver.

The I/O program 342 processes an I/O request such as a write request or a read request from the client 103.

The cache 303 is an area managed by the contiguous area usage program 301. The cache 303 included a device area 331 and an I/O area 332. The device program 304 uses the device area 331 as a buffer for a virtual device. The I/O program 305 uses the I/O area 332 as a cache for an I/O process.

In an I/O process, the I/O program 305 issues a DMA transfer request indicating the transfer source and transfer destination of a DMA transfer to the DMA controller 132. For example, the DMA controller 132 can perform a DMA transfer of data in the device area 331 to the I/O area 332 or a DMA transfer of data in the I/O area 332 to the device area 331 in accordance with an instruction from the I/O program 305. The data to be DMA transferred may be write data received from the client 103 in accordance with a write request, read data read from the drive 125 in accordance with a read request, or read data read from the I/O area 332 due to a cache hit at the time of a read request. Note that one of the transfer source and the transfer destination of a DMA transfer executed by the DMA controller 132 may be a memory in a physical device such as the network interface 123, the drive interface 124, the drive 125, or the like.

The contiguous area usage program 301 allocates physically contiguous memory areas to the device area 331 and the I/O area 332 respectively. By configuring at least one of the transfer source and the transfer destination of a DMA transfer to an area in the cache 303, the DMA controller 132 can transfer data continuously, hence the data can be transferred at high speed while suppressing the load on the CPU 121. As a result, the performance of the virtual storage 111 can be secured.

Figure 5:
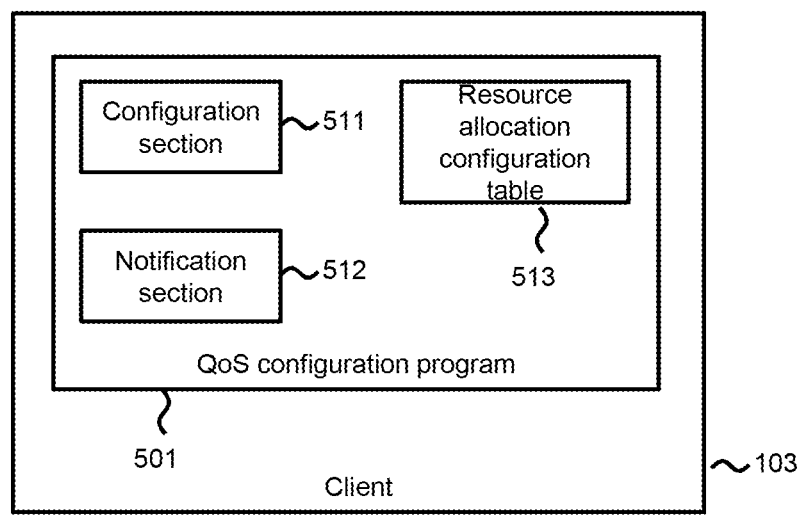
FIG. 5 shows a configuration of a client 103.

FIG. 5 shows the configuration of the client 103.

The client 103 includes a memory, a CPU, a network interface coupled to the network 102, an input device for receiving an input from a user, and a display device for displaying information. In the client 103, the memory stores programs and data, and the CPU executes processes in accordance with programs. The memory stores a QoS configuration program 501.

The QoS configuration program 501 includes a configuration section 511, a notification section 512, and a resource allocation configuration table 513. The configuration section 511 receives a setting input from a user. The notification section 512 communicates with the computer 101. The resource allocation configuration table 513 stores the same information as the resource allocation management table 214.

Figure 6:
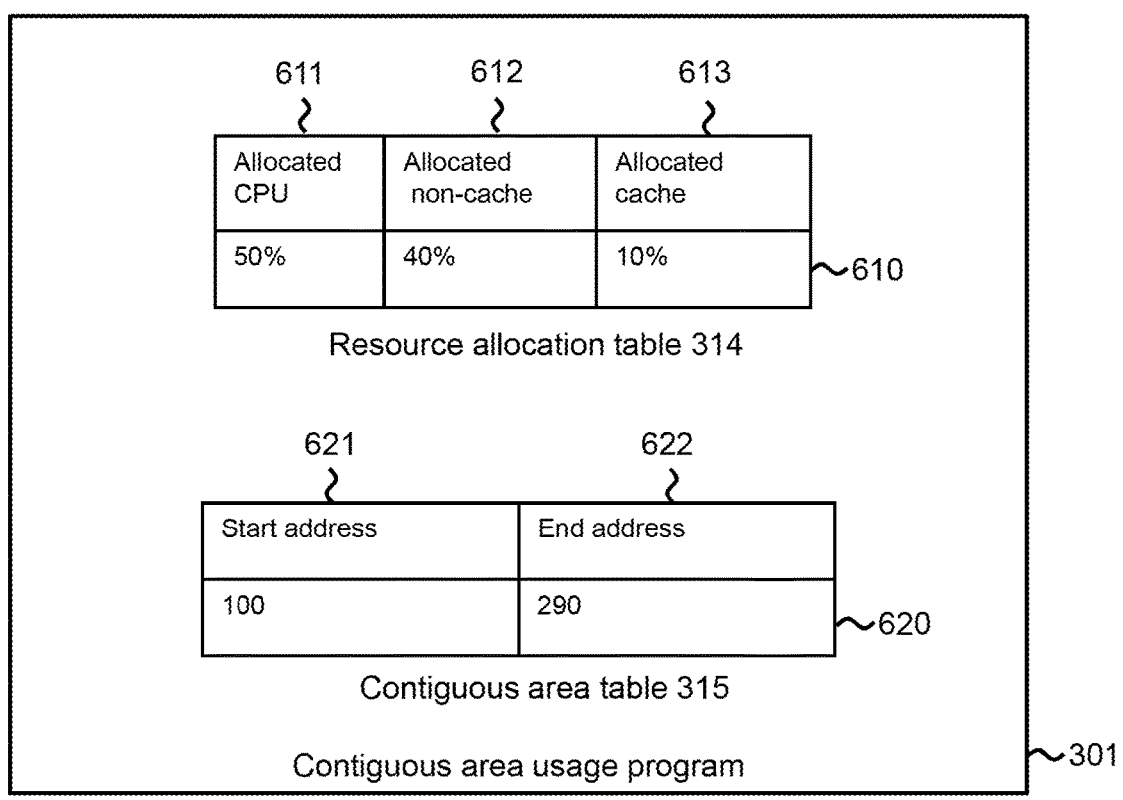
FIG. 6 shows a resource allocation table 314 and a contiguous area table 315 in a contiguous area usage program 301.

FIG. 6 shows a resource allocation table 314 and a contiguous area table 315 in the contiguous area usage program 301.

The resource allocation table 314 stores an allocated CPU 611 which indicates the allocation status of the CPU 122 to the virtual storage, an allocated non-cache 612 which indicates the allocation status of the physical memory A 222 to the virtual storage, and an allocated cache 613 which indicates the allocation status of the physical memory B 231 to the virtual storage.

The physical memory A 222 is allocated to a process such as the virtual storage 111 as memory for non-cache use, and is used for executing the process. An area of the physical memory A 222 is allocated to the non-cache as a virtual memory area. The physical memory area corresponding to the virtual memory area need not be physically contiguous.

The physical memory B 231 is allocated to the virtual storage 111 as memory for cache use, and is used for I/O processes of the virtual storage 111 such as I/O data storage.

An entry 610 in the example of the resource allocation table 314 indicates that the CPU resource allocated to the virtual storage is 50% of the CPU 122 of the computer 101, that the non-cache allocated to the virtual storage is 40% of the physical memory A 222 of the computer 101, and that the cache allocated to the virtual storage is 10% of the physical memory B 231 of the computer 101. Note that, in this example, allocation status is indicated by allocated ratios, however, allocation status may also be indicated by allocated times or allocated sizes.

The contiguous area table 315 stores the start address 621 of a contiguous area in the physical memory B 231 allocated to the virtual storage, and the end address 622 of the contiguous area.

An entry 620 in the example of the contiguous area table 315 indicates that the start address of the contiguous area allocated to the virtual storage is 100, and that the end address thereof is 290.

Figure 7:
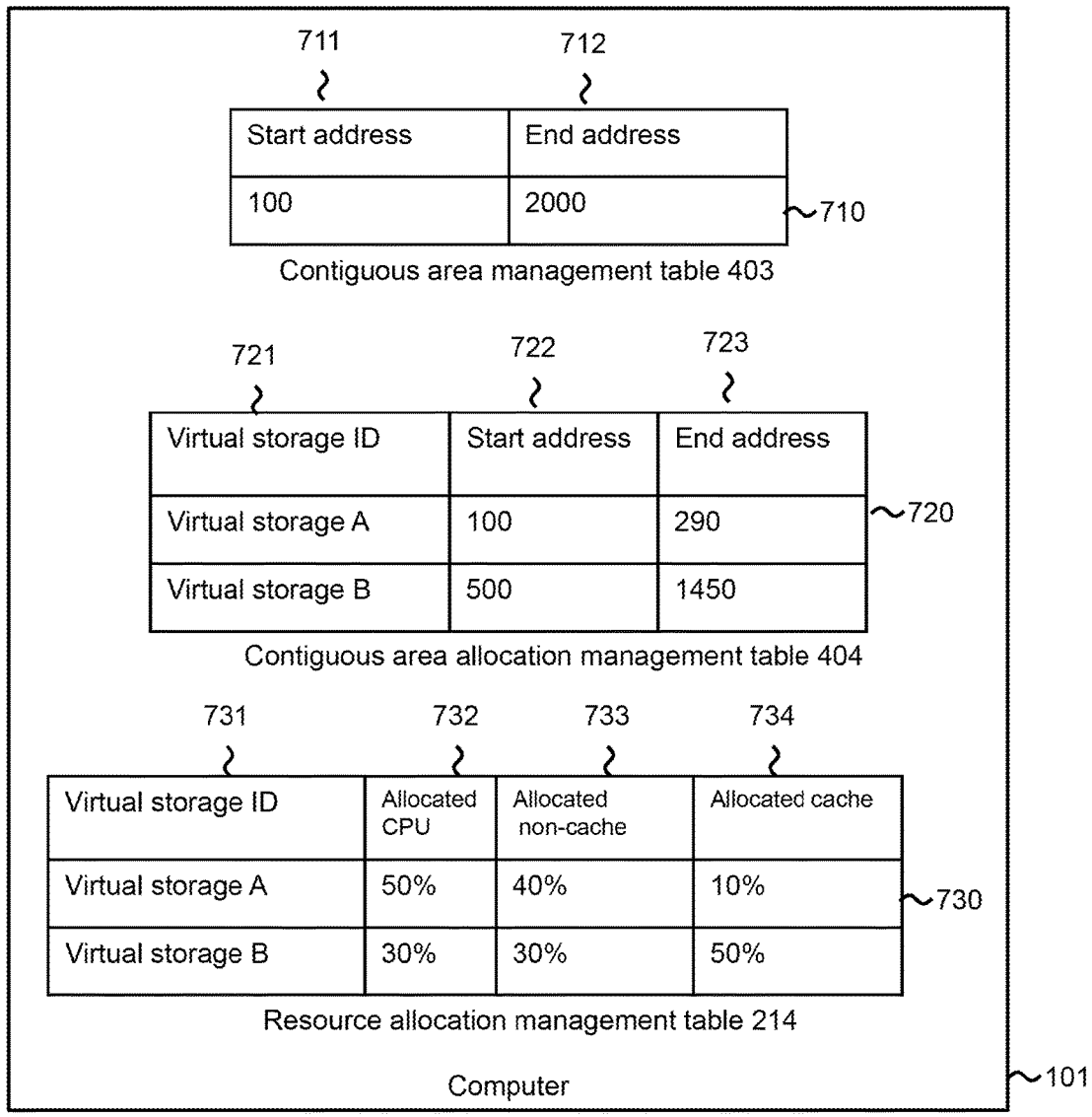
FIG. 7 shows a contiguous area management table 403, a contiguous area allocation management table 404, and a resource allocation management table 214 in the computer 101.

FIG. 7 shows a contiguous area management table 403, a contiguous area allocation management table 404, and a resource allocation management table 214 in the computer 101.

The contiguous area management table 710 stores a start address 711 and an end address 712 of the physical memory B 231, that is, the non-OS-managed physical resource 203. An entry 710 in the example of the contiguous area management table 403 indicates that the start address of the physical memory B 231 is 100 and that the end address thereof is 2000.

The contiguous area allocation management table 404 stores a virtual storage ID 721 for identifying a virtual storage 111, and a start address 722 and an end address 723 of the contiguous area allocated to the virtual storage identified by the ID. An entries 720 in the example of the contiguous area allocation management table 404 indicates that a contiguous area having a start address of 100 and an end address of 290 is allocated to the virtual storage identified as virtual storage A.

The identical or similar information as that of the resource allocation table 314 for each virtual storage executed on the OS 201 is stored in the resource allocation management table 214. The resource allocation management table 214 stores a virtual storage ID 731 for identifying a virtual storage 111, an allocated CPU 732 indicating the allocation status of the CPU to the virtual storage identified by the ID, an allocated non-cache 733 which indicates the allocation status of memory for non-cache use to the virtual storage, and an allocated cache 734 which indicates the allocation status of memory for cache use to the virtual storage. An entry 730 in the example of the resource allocation management table 214 indicates that the CPU allocation to the virtual storage A is 50% of the CPU 122 of the computer 101, that the non-cache allocation to the virtual storage A is 40% of the physical memory A 222 in the computer 101, and that the cache allocation to the virtual storage A is 10% of the physical memory B 231 of the computer 101. Note that, in this example, allocation status is indicated by allocated ratios, however, allocation status may also be indicated by allocated times or allocated sizes.

With these tables, the computer 101 can manage the contiguous areas allocated to each of the plurality of virtual storages 111 from the physical memory B 231.

FIG. 8 shows a resource allocation configuration table 513 in the client 103.

The identical or similar information as that in the resource allocation management table 214 is stored in the resource allocation configuration table 513. The resource allocation configuration table 513 stores a virtual storage ID 811 for identifying a virtual storage 111, an allocated CPU 812 which indicates the allocation status of the CPU to the virtual storage identified by the ID, an allocated non-cache 813 which indicates the allocation status of memory for non-cache use to the virtual storage, and an allocated cache 814 which indicates the allocation status of memory for cache use to the virtual storage. An entry 810 of the resource allocation configuration table 513 indicates that the CPU allocation to the virtual storage A is 50% of the CPU 122 of the computer 101, that the non-cache allocation to the virtual storage A is 40% of the physical memory A 222 of the computer 101, and that the cache allocation to the virtual storage A is 10% of the physical memory B 231 of the computer 101. Note that, in this example, allocation status is indicated by allocated ratios, however, allocation status may also be indicated by allocated times or allocated sizes.

Operation of the computer system according the present embodiment will be described hereinafter.

Figure 9:
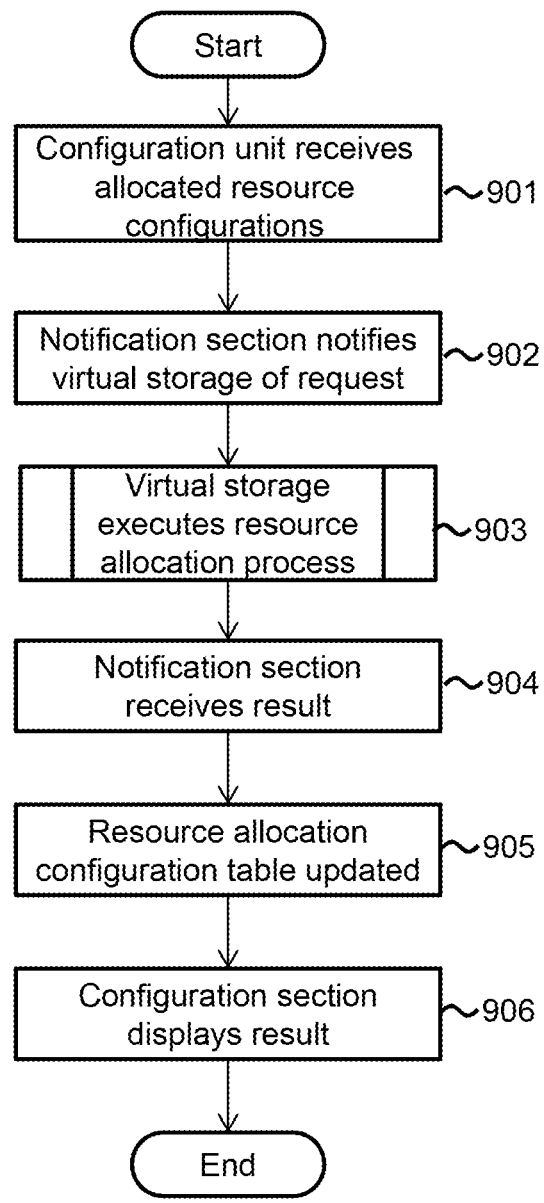
FIG. 9 shows a resource configuration process executed by the client 103.

FIG. 9 shows a resource configuration process executed by the client 103.

This process is executed by the client 103 when a resource allocation amount is input by a user to the client 103 in order to allocate resources to the virtual storage 111.

The configuration section 511 receives, from a user, a request including virtual storage ID, and a CPU amount, a non-cache amount, and a cache amount to be allocated to the virtual storage indicated by the virtual storage ID (step 901).

The notification section 512 notifies the virtual storage of requested virtual storage ID, the CPU amount, the non-cache amount, and the cache amount (step 902). On receiving the notification, the virtual storage 111 executes a resource allocation process (described later) (step 903).

The notification section 512 receives the virtual storage ID, the allocated CPU amount, the allocated non-cache amount, and the allocated cache amount from the virtual storage 111 as a result of the resource allocation process (step 904). The notification section 512 updates the allocated CPU 812, the allocated non-cache 813, and the allocated cache 814 of the virtual storage in the resource allocation configuration table 513 to the received allocated CPU amount, allocated non-cache amount, and allocated cache amount (step 905).

The configuration section 511 displays the virtual storage ID and the CPU amount, the non-cache amount, and the cache amount allocated to the virtual storage (step 906).

With the resource configuration process described above, a user can configure the resource amounts of the virtual storage 111 using the client 103. A management computer may be used in place of the client 103.

Figure 10:
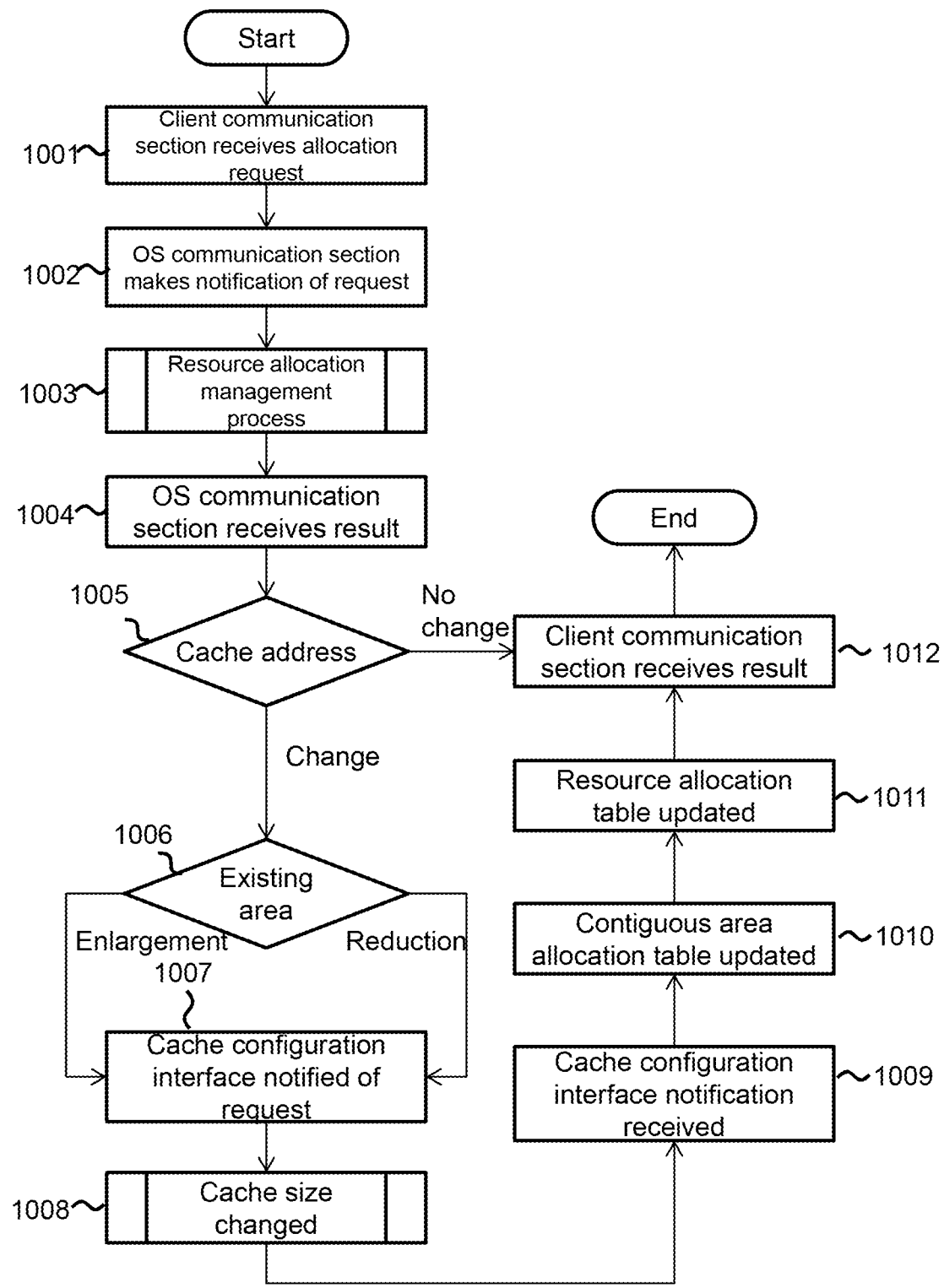
FIG. 10 shows a resource allocation process executed by the virtual storage 111.

FIG. 10 shows the resource allocation process executed by the virtual storage 111.

This process is executed by the virtual storage 111 in step 903 of the resource configuration process described above. Note that the virtual storage 111 may execute the resource allocation process at the time of activation using a pre-set CPU amount, non-cache amount, and cache amount.

The client communication section 312 receives, from the client 103, a virtual storage ID and a requested CPU amount, non-cache amount, and cache amount to be allocated to the virtual storage (step 1001). The OS communication section 311 notifies the contiguous area management program 213 of the received virtual storage ID and requested CPU amount, non-cache amount, and cache amount to be allocated to the virtual storage (step 1002). Upon receiving this notification, the contiguous area management program 213 executes a resource allocation management process (described later) (step 1003).

As a result of the resource allocation management process, the OS communication section 311 receives, from the contiguous area management program 213, the virtual storage ID, the CPU amount and the non-cache amount allocated to the virtual storage, and the start address and end address of the area of the physical memory B 231 allocated as the cache 303 to the virtual storage (step 1004).

The area adjustment section 313 determines whether or not the start address and the end address of the cache 303 received in step 1005 have been changed from the addresses stored in the contiguous area table 315.

If the addresses have been changed in step 1005, the area adjustment section 313 determines whether the existing area of the cache 303 is to be enlarged or reduced in step 1006.

When the area is enlarged in step 1006, the area adjustment section 313 notifies the storage control program 302 of the start address of the enlarged area, that is, the area of the enlarged cache 303, the end address of the enlarged area, and of the fact that the request is an allocation request using the cache configuration interface 322 (step 1007).

When the area is reduced in step 1006, the area adjustment section 313 notifies the cache adjustment program 321 of the start address of the reduced area, that is, the area of the reduced cache 303, the end address of the reduced area, and of the fact that the request is a deallocation request using the cache configuration interface 322 (step 1007).

After step 1007 has been executed, the cache adjustment program 321 executes a cache size changing process (step 1008).

The area adjustment section 313 receives a completion of the cache size changing process executed by the cache adjustment program 321 via the cache configuration interface 322 (step 1009). The area adjustment section 313 stores the start address and the end address of the cache 303 received in step 1004 in the contiguous area table 315 (step 1010). The area adjustment section 313 changes the allocated CPU and the allocated non-cache of the resource allocation table 314 to the allocated CPU amount and the allocated non-cache amount received in step 1004 respectively and updates the allocated cache of the resource allocation table 314 to the allocated cache amount obtained from the result of the cache size changing process executed in step 1009 (step 1011).

The client communication section 312 notifies, as a resource allocation result, the client 103 of the allocated CPU amount, the allocated non-cache amount, and the allocated cache amount changed in step 1010 (step 1012).

With the resource allocation process described above, the virtual storage 111 can acquire resources corresponding to requested resource amounts in accordance with a request from the client 103.

Figure 11:
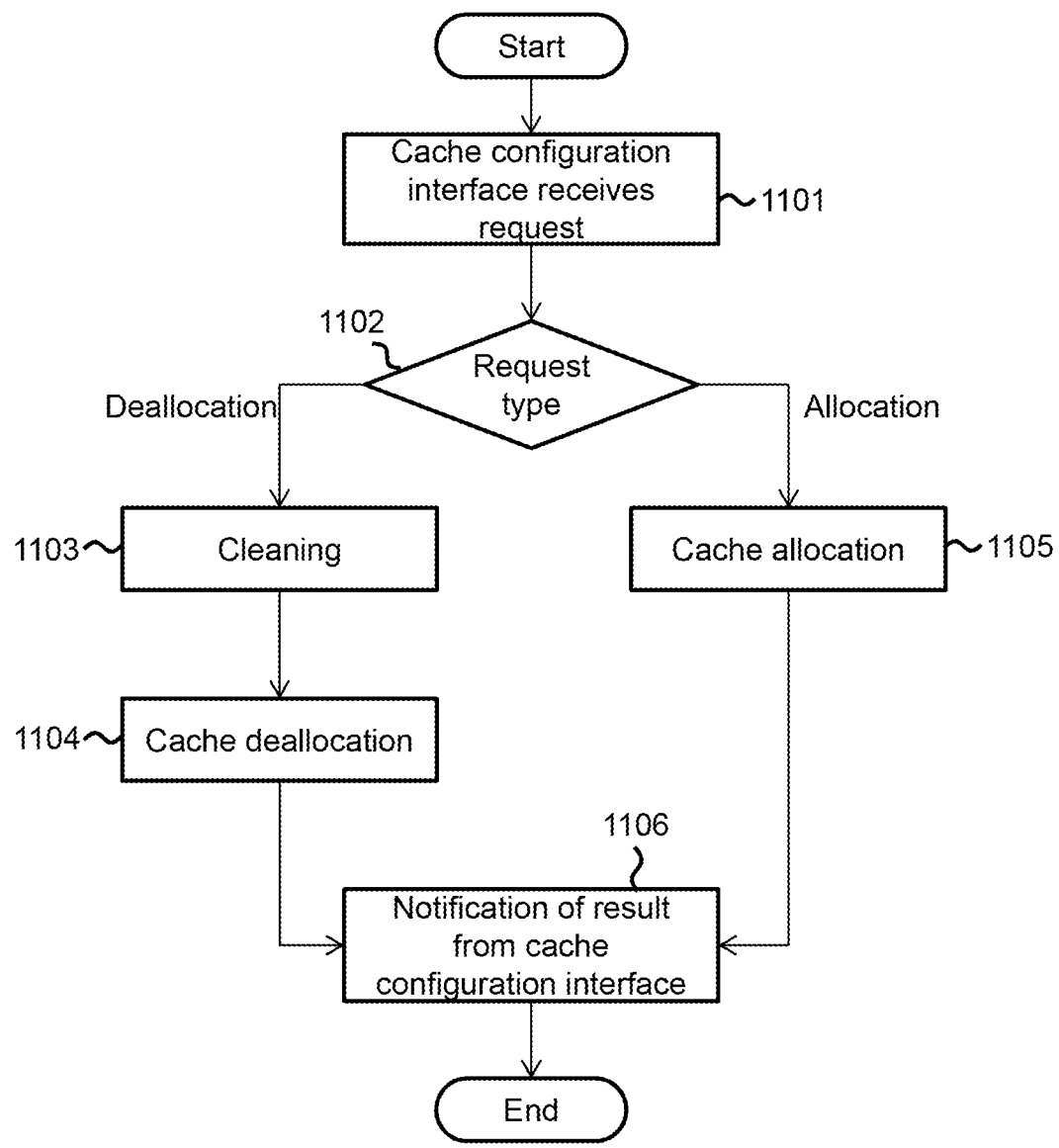
FIG. 11 shows a cache size changing process executed by the virtual storage 111.

FIG. 11 shows a cache size changing process executed by the virtual storage 111.

This process is executed by the storage control program 302 when the storage control program 302 receives a notification in step 1008 of the resource allocation process described above.

The cache configuration interface 322 receives, as a cache size change request, the start address and end address of a change area and a change request type (step 1101). The change request type is either a deallocation request or an allocation request.

The cache adjustment program 321 determines whether the change request type is a deallocation request or an allocation request (step 1102).

If the request type in step 1102 is a deallocation request, the cache adjustment program 321 converts the cache of the area specified by the addresses to a clean state (step 1103) and deallocates the area (step 1104). Here, if data in a dirty state is present in the cache, the cache adjustment program 321 can convert the data to a clean state by destaging the data to the drive 125.

If the request type in step 1102 is an allocation request, the cache adjustment program 321 allocates the area specified by the addresses as a cache (step 1105).

On completion of step 1104 or step 1105, the cache adjustment program 321 notifies the area adjustment section 313 that the cache size changing process has been completed using the cache configuration interface 322 (step 1106).

With the cache size changing process described above, the virtual storage 111 can change the cache size in accordance with the size of a contiguous area allocated thereto. By changing the area allocated to the cache of the virtual storage 111, a contiguous area for the cache of another virtual storage can be reserved.

Figure 12:
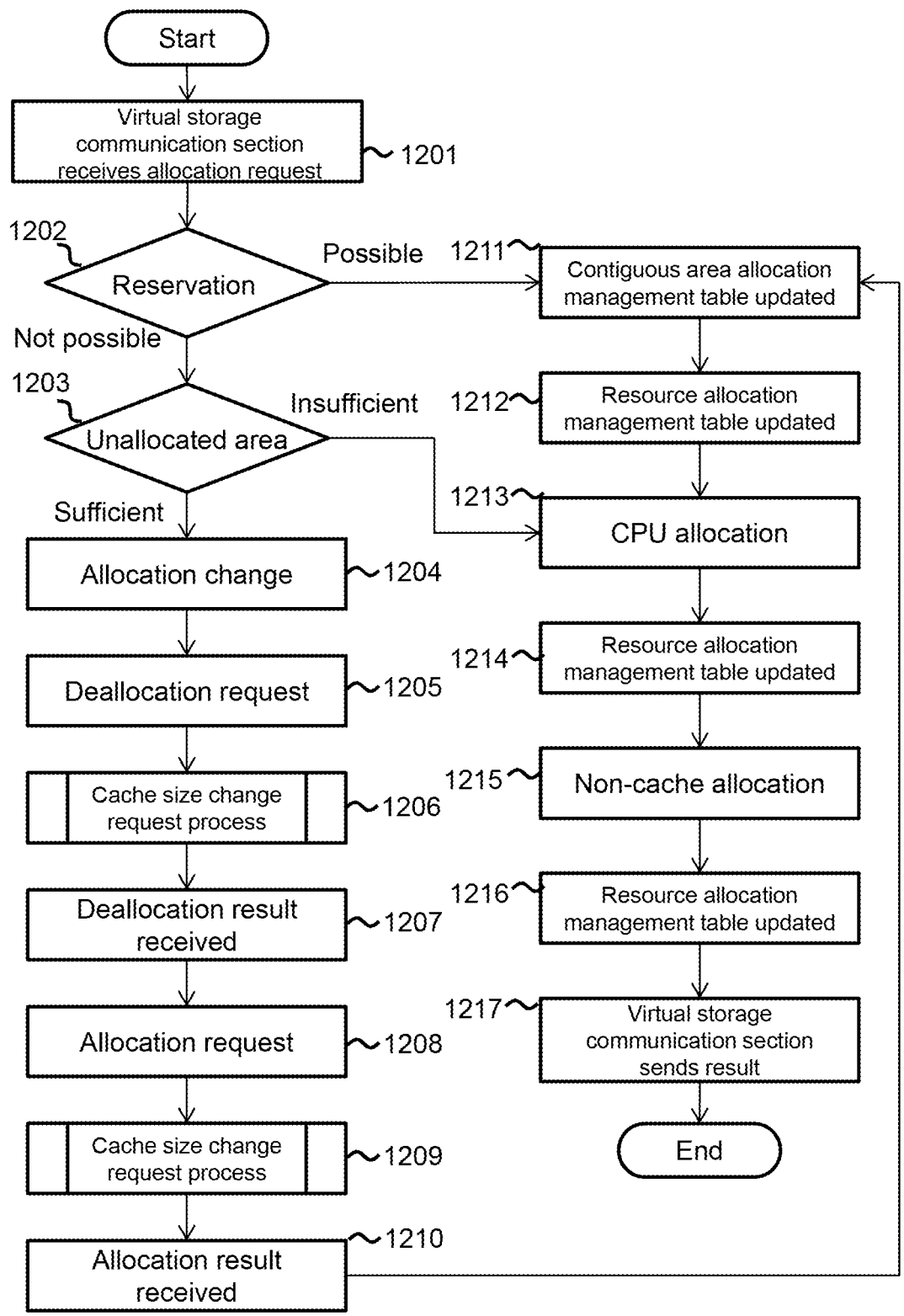
FIG. 12 shows a resource allocation management process executed by a contiguous area management program 213.

FIG. 12 shows a resource allocation management process executed by the contiguous area management program 213.

This process is executed by the contiguous area management program 213 in step 1003 of the resource allocation process described above.

The virtual storage communication section 401 of the contiguous area management program 213 receives, from the virtual storage 111, a virtual storage ID for identifying a virtual storage for which resource allocation has been requested, and a requested CPU amount, non-cache amount, and cache amount (requested cache size) (step 1201).

The area adjustment management section 402 determines whether or not a contiguous area of the received requested cache size can be reserved (step 1202). Specifically, using the contiguous area management table 403 and the contiguous area allocation management table 404, the area adjustment management section 402 determines whether or not a contiguous area of the requested cache size can be reserved by combining the area allocated to the virtual storage stored in the contiguous area allocation management table 404 and an unallocated area contiguous thereto. In an example of the contiguous area management table 403 and the contiguous area allocation management table 404 described above, it is assumed that the contiguous area management program 213 has received an allocation request, in which a requested cache size is 900, from the virtual storage A in step 1201. As the virtual storage A has already been allocated a size of 190 which is represented by addresses from 100 to 290, the size that needs to be newly reserved is 900−190=710. At this time, according to the contiguous area allocation management table 404, the contiguous area that can be reserved by the virtual storage A is the 210 between 290 and 500, hence the area adjustment management section 402 cannot reserve a contiguous area of the requested cache size. Note that, when a contiguous area is not allocated to the cache of a virtual storage, such as when the virtual storage is activated, the area adjustment management section 402 determines whether or not a contiguous area can be reserved from the unallocated area.

If a reservation cannot be made in step 1202, the area adjustment management section 402 uses the contiguous area management table 403 and the contiguous area allocation management table 404 to acquire the size of the unallocated area not allocated to the virtual storage in the area of the physical memory B 231, and determines whether or not an unallocated area equal to or larger than the requested cache size to be allocated received in step 1201 is available (step 1203). In an example of the contiguous area management table 403 and the contiguous area allocation management table 404 described above, unallocated area is divided into an area having a size of 210 represented by addresses from 290 to 500, and an area having a size of 550 represented by addresses from 1450 to 2000, and the total size thereof is 760. The requested cache size is 710, hence it is determined that an unallocated area of sufficient size is available.

If the unallocated area is sufficient in step 1203, the area adjustment management section 402 changes the area allocated to each virtual storage so that the contiguous area allocated to each virtual storage has contiguous addresses (step 1204). In an example of step 1203 described above, the area adjustment management section 402 changes the area allocated to the virtual storage A from the area represented by addresses from 100 to 290 to the area represented by addresses from 100 to 1000, and changes the area allocated to the virtual storage B from the area represented by addresses from 500 to 1450 to the area represented by addresses from 1000 to 1950.

As a result of the allocated areas being changed, the virtual storage communication section 401 requests that virtual storages requiring deallocation of an allocated area perform a cache size change request process. At this time, the virtual storage communication section 401 makes a notification of the start address and end address of the deallocation area, and of the fact that that the request is a deallocation request (step 1205). In an example of step 1204 described above, the virtual storage communication section 401 notifies the virtual storage B of a deallocation request for the area represented by addresses from 500 (start address) to 1000 (end address).

In response to the request, the virtual storage 111 executes the cache size change request process described above (step 1206).

The virtual storage communication section 401 receives a cache size change request process completion notification from the virtual storage (step 1207).

As a result of the allocated areas being changed in step 1204, the virtual storage communication section 401 requests that virtual storages requiring new area allocation perform the cache size change request process. At this time, the virtual storage communication section 401 makes a notification of the start address and end address of an allocation area, and of the fact that that the request is an allocation request (step 1208). For example, the virtual storage communication section 401 requests that the area represented by the area from 290 to 1000 be allocated to the virtual storage A, and requests that the area represented by the area from 1450 to 1950 be allocated to the virtual storage B.

The virtual storage 111 executes the cache size change request process (step 1209). The virtual storage communication section receives a cache size change request process completion notification from the virtual storage (step 1210).

The virtual storage communication section 401 updates the contiguous area allocation management table 404 to reflect the change made in step 1204 (step 1211). For example, in the contiguous area allocation management table 404, the virtual storage communication section 401 changes the start address of the virtual storage A to 100 and the end address thereof to 1000, and the start address of virtual storage B to 1000 and the end address thereof to 1950.

If reservation is possible in step 1202, the virtual storage communication section 401 updates the contiguous area allocation management table 404 using the start address and the end address of the reserved area (step 1211).

The virtual storage communication section 401 updates the allocated cache 734 of the resource allocation management table 214 using the requested cache size of step 1201 (step 1212).

The CPU allocation adjustment program 211 of the OS 201 configures the CPU amount requested in step 1201 to the virtual storage 111 (step 1213).

The CPU allocation adjustment program 211 executes step 1213 even when the unallocated area is insufficient in step 1203.

The CPU allocation adjustment program 211 updates, on the basis of an allocated CPU amount from the virtual storage, the allocated CPU 732 for the virtual storage in the resource allocation management table 214 (step 1214).

The memory allocation adjustment program 212 of the OS 201 configures the non-cache amount requested in step 1201 to the virtual storage (step 1215). The memory allocation adjustment program changes, on the basis of the allocated non-cache amount, the allocated non-cache 733 for the storage in the resource allocation management table 214 (step 1216).

As a result of resource allocation, the virtual storage communication section 401 notifies the virtual storage of a virtual storage ID, a CPU amount and a non-cache amount acquired from the resource allocation management table 214, and of the start address and end address identified from the virtual storage ID acquired from the contiguous area allocation management table 404 (step 1217).

With the resource allocation management process described above, the contiguous area management program 213 can allocate a contiguous area to the cache 303 of the virtual storage 111 in accordance with a request. By allocating a contiguous area to the cache, the virtual storage 111 can perform DMA transfer in an I/O process and the performance of the virtual storage 111 can be improved. Further, by configuring the cache size, it is possible to control the balance of performance of each virtual storage 111. By using the contiguous area management table 403 and the contiguous area allocation management table 404, the contiguous area management program 213 can select a contiguous area in accordance with a request. Even when it is determined that a contiguous area having the requested cache size cannot be reserved, the contiguous area management program 213 migrates an area allocated to another virtual storage in the physical memory B 232 so as to reserve the contiguous area, whereby the physical memory B 232 can be used effectively.

Figure 13:
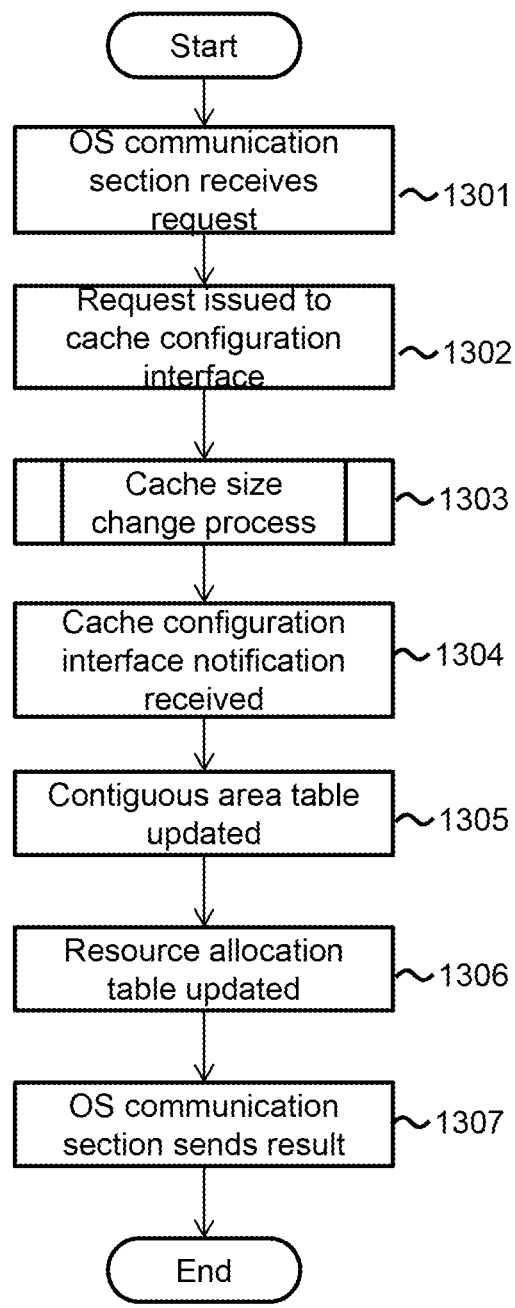
FIG. 13 shows a cache size change request process executed by the virtual storage 111.

FIG. 13 shows a cache size change request process executed by the virtual storage 111.

This process is executed by the contiguous area usage program 301 in accordance with steps 1206 and 1209 of the resource allocation management process.

The OS communication section 311 receives the start address and the end address of an area for which cache allocation is to be changed and a change request type (step 1301).

Using the cache configuration interface 322, the area adjustment section 313 notifies the storage control program 302 of the start address and end address of the area for which cache allocation is to be changed, and the change request type (step 1302). The storage control program 302 executes the cache size changing process described above (step 1303).

The area adjustment section 313 receives a cache size changing process completion notification from the storage control program 302 (step 1304). The area adjustment section 313 updates the contiguous area table 315 using the start address and the end address received in step 1301 (step 1305). For example, in an example of the contiguous area table 315 described above, on receiving an allocation request with a start address of 290 and an end address of 1000 in step 1301, the area adjustment section 313 changes the end address 622 of the contiguous area table 315 from 290 to 1000 without changing the start address 621.

The area adjustment section 313 changes the allocated cache 613 of the resource allocation table 314 to post-size change information (step 1306).

The OS communication section 311 notifies the OS 201 of the completion of the cache size change request process (step 1307).

Figure 14:
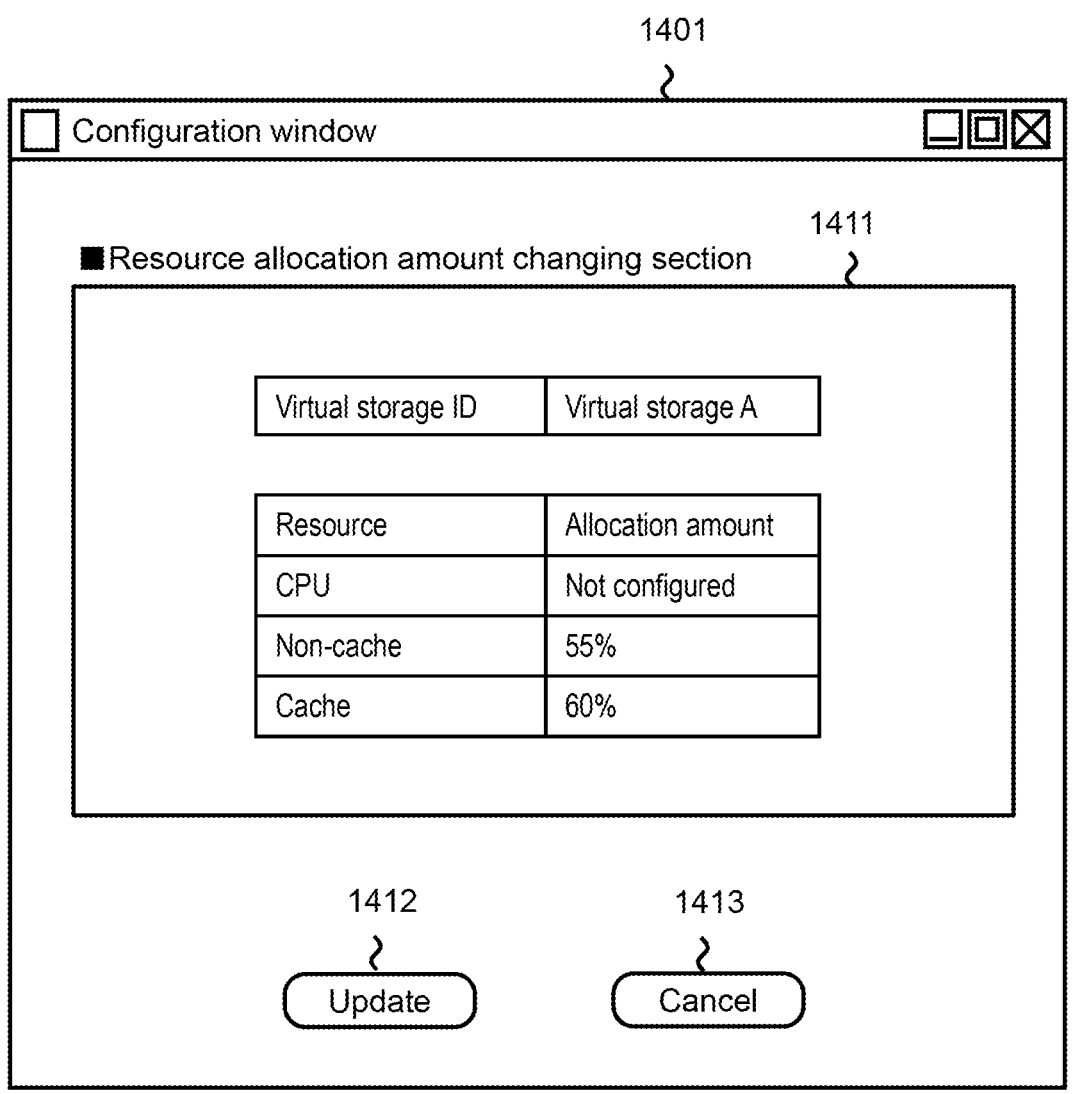
FIG. 14 shows a configuration window 1401.

FIG. 14 shows a setting window 1401.

In the resource configuration process described above, the configuration section 511 of the QoS configuration program 501 in the client 103 displays the configuration window 1401 on a display device so that the allocation amount of resources to the virtual storage 111 can be changed.

The configuration window 1401 includes a resource allocation amount changing section 1411, an update button 1412, and a cancel button 1413.

The resource allocation amount changing section 1411 displays a virtual storage ID and allocated amounts of the CPU, non-cache, and cache to the virtual storage identified by the virtual storage ID. Further, the resource allocation amount changing section 1411 accepts changes to the virtual storage ID and the allocation amount of each resource.

When the user presses the update button 1412, the configuration section 511 receives, from the input device, the virtual storage ID and the requested CPU amount, non-cache amount, and cache amount to be allocated to the virtual storage, and executes step 901.

When the user presses the cancel button 1413, the configuration section 511 terminates the resource allocation process and closes the configuration window 1401.

With the configuration window 1401, a user can use the client 103 to issue a request for resource amounts to be allocated to the virtual storage 111. As the CPU amount, the non-cache amount, and the cache amount influence the performance of the virtual storage 111, configuration thereof allows the performance of the virtual storage 111 to be secured. Further, by configuring the resource amounts among the plurality of virtual storages, balance in the performance of the virtual storages can be controlled.

With this embodiment, allocation of a contiguous area to a cache can be realized by using a function of the OS 201 and adding the contiguous area management program 213 to the computer 101, hence the amount that a program is modified can be suppressed and the cost of developing the program can be reduced.

Embodiment 2

In the present embodiment, parts which differ from those of the first embodiment will be described.

Compared with the first embodiment, the physical resources in the computer 101 of the present embodiment do not include the non-OS-managed physical resource 203. In other words, the OS 201 of the present embodiment can use all of the physical memory 121 as the physical memory A 222.

Figure 15:
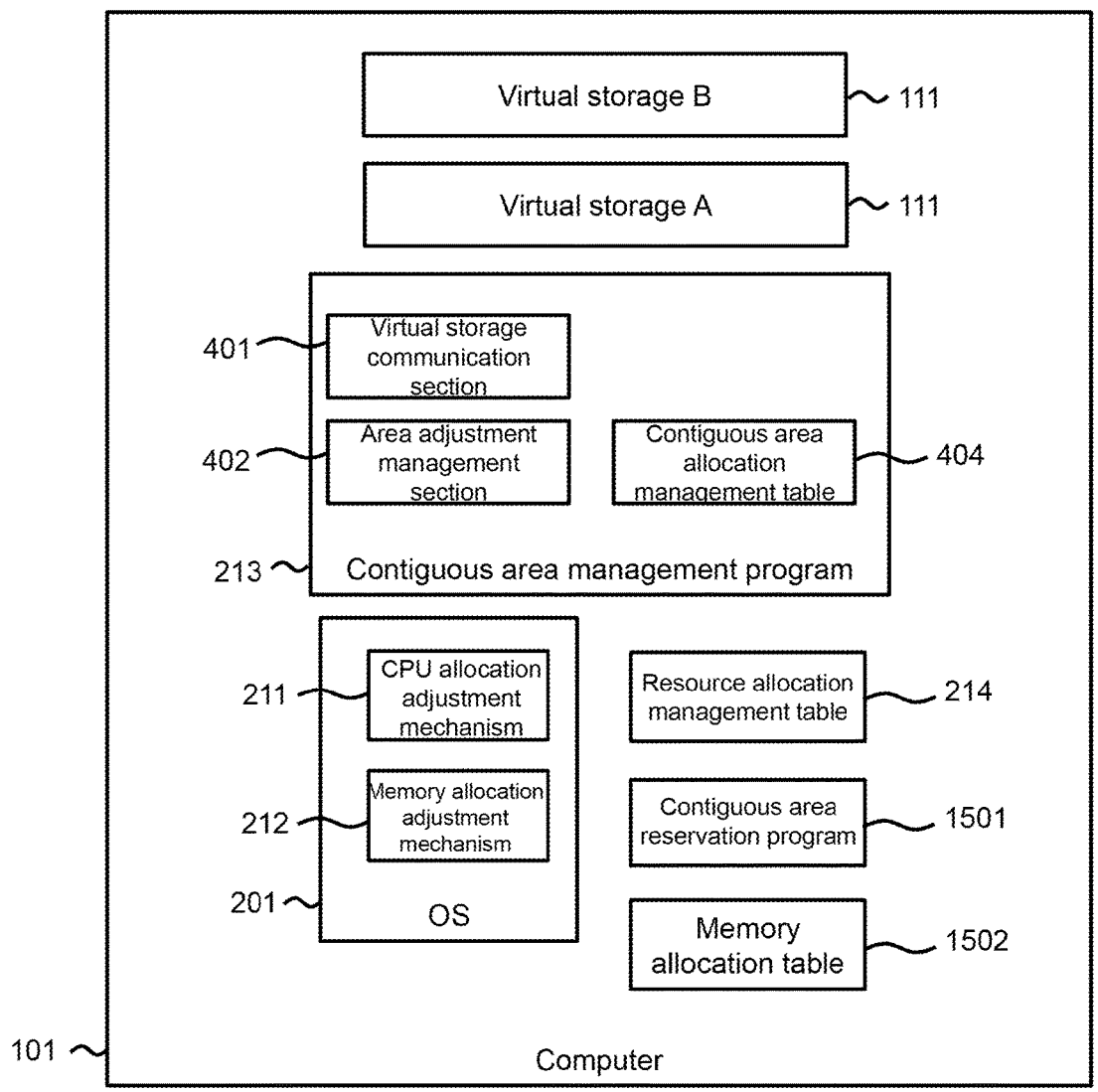
FIG. 15 shows a logical configuration of the computer 101 according to a second embodiment.

FIG. 15 shows a logical configuration of the computer 101 according to the second embodiment.

Compared with the first embodiment, the computer 101 of the present embodiment does not include the contiguous area management table 403, but does include a contiguous area reservation program 1501 and a memory allocation table 1502. The contiguous area reservation program 1501 reserves a contiguous area as a cache. The memory allocation table 1502 manages a memory area allocated to each process.

With this configuration, a contiguous area in the physical memory 121 can be reserved even when all the physical resources in the computer 101 are managed by the OS 201.

FIG. 16 shows the memory allocation table 1502.

The memory allocation table 1502 stores the physical addresses 1611 of areas in the physical memory A 222, allocation destination IDs 1612 for identifying the allocation destinations of the areas identified by the addressed, and virtual addresses 1613 when a virtual address is provided to the allocation destinations. For example, a virtual address is provided to a process. In the present embodiment, it is assumed that the OS 201 manages the physical memory 121 using a fixed length, however, when the physical memory is managed using a variable length, the table may include an end address.

An entry 1610 in the example of the memory allocation table 1502 indicates that an area identified by a physical address of 100 is allocated to the virtual storage A. Further, an entry 1620 indicates that an area identified by a physical address of 120 is allocated to a process X other than virtual storage, and that this area is provided to the process X as an area having a virtual address of 0.

The computer 101 of the present embodiment uses this table instead of the contiguous area management table 403 shown in the first embodiment.

With the memory allocation table 1502, a contiguous area can be reserved by managing the areas allocated to each process in the physical memory 121.

A part of the resource allocation management process in the present embodiment differs from that of the first embodiment. In the present embodiment, the process in step 1202 of the resource allocation management process is replaced by the reservation process described below.

FIG. 17 shows the reservation process.

After step 1201 has been executed in the resource allocation management process, the contiguous area reservation program 1501 determines whether or not a requested cache size can be reserved in a current allocation state (step 1701).

When it is determined in step 1701 that the requested cache size can be reserved, the contiguous area reservation program 1501 pins down the area (step 1702). The pin down prevents data in the area from being swapped out and the area from being deallocated. In other words, the OS 201 can fix and use the area by performing a pin down. Thereafter, the virtual storage communication section 401 returns the fact that reservation is possible to the resource allocation management process (step 1703). As a result, the resource allocation management process executes step 1211.

When it is determined in step 1701 that the requested cache size cannot be reserved, the contiguous area reservation program 1501 replaces unallocated areas with areas not required to be physically contiguous, and expands physically contiguous areas in an unallocated state which can be allocated to a virtual storage requesting a cache (step 1704).

For example, in an example of the memory allocation table 1502 described above, a case where an allocation request to allocate a cache having a size of 30 to the virtual storage A is issued is used as an example. As the memory areas allocated to processes other than the virtual storage need not be physically contiguous, the contiguous area reservation program 1501 replaces an area having a physical address of 120 allocated to the process X with an unallocated area. Then, the contiguous area reservation program 1501 copies the data stored in the area having a physical address of 120 to an unallocated area having a physical address of 150. Then, the contiguous area reservation program 1501 changes the area provided to the process X as a virtual address of 0 from the area having a physical address of 120 to the area having a physical address of 150.

The contiguous area reservation program 1501 determines whether or not a cache of the requested cache size can be reserved as a result of expanding a physically contiguous area in an unallocated state (step 1705).

If reservation is possible in step 1705, the contiguous area reservation program 1501 executes the step 1702 described above.

If reservation is not possible in step 1705, the area adjustment management section 402 returns to the resource allocation management process the fact that reservation is not possible (step 1706). As a result, the resource allocation management process executes step 1203.

With the reservation process described above, the contiguous area reservation program 1501 changes an area in the physical memory 121 allocated to a specific process other than virtual storage, thereby reserving a contiguous area for the virtual storage 111 and, as a result, the physical memory 121 can be effectively used. Further, by copying the data in the area allocated to the specific process to the unallocated area, the contiguous area reservation program 1501 can continue the specific process and change the area allocated to the specific process to an unallocated area. By pinning down the reserved contiguous area, the contiguous area reservation program 1501 is capable of fixing an area to be allocated and preventing the area from being deallocated.

With the present embodiment, the computer 101 can use the physical memory 121 as a cache for the OS 201 and the virtual storage 111 without dividing the physical memory 121 into the physical memory A 222 and the physical memory B 231 and, as a result, the physical memory 121 can be effectively used.

Terms used in the expression of the present invention will be described hereinafter. Area information may be the contiguous area management table 403, the contiguous area allocation management table 404, the resource allocation management table 214, the resource allocation table 314, and the contiguous area table 315, or a part of this information. Configuration request may be the request in step 901 of the resource configuration process. Specific size may be a requested cache size or the ratio of a requested cache size to a memory size that can be allocated as a cache.

Embodiments of the present invention have been described above, however, these are examples for explaining the present invention, and are not intended to limit the scope of the present invention to the configurations described above. The present invention can be implemented in various other forms.

REFERENCE SIGNS LIST

101 Computer
102 Network
103 Client
111 Virtual storage
121 Physical memory
122 CPU
123 Network interface
124 Drive interface
125 Drive
131 Core
132 DMA controller
201 OS

The invention claimed is:

1. A computer comprising:
   a memory; and
   a processor coupled to the memory,
   a DMA controller which is coupled to the memory and the processor and is configured to perform transfer in accordance with a DMA transfer request from the processor;
   an OS which is configured to be executed on the processor and execute a plurality of processes thereon,
   wherein:
   the plurality of processes include a first virtual storage apparatus which executes 10 processing to a storage device;
   the DMA controller is configured to transfer data in which the first virtual storage apparatus performs 10;
   the processor is configured to:
   virtualize and allocate a first area of the memory to the plurality of processes including the first virtual storage apparatus executing 10 processing, and
   allocate a physically contiguous area to a second area of the memory as a cache where the first virtual storage apparatus and the DMA controller store and exchange data of the 10;
   wherein
   one of the plurality of processor is a second virtual storage apparatus,
   the processor is configured to determine, when determination is made that the contiguous area having the specific size cannot be reserved, whether or not the size of an unallocated area of the second area is equal to or greater than the specific size, with this unallocated area having not been allocated to the first virtual storage apparatus, and
   when determination is made that the size of the unallocated area is equal to or greater than the specific size, the processor is configured to:
   change a specific area of the second area to an area in the unallocated area, with this specific area being allocated to the second virtual storage apparatus, thereby reserving the contiguous area having the specific size; and
   convert data in the specific area to a clean state, deallocate the specific area, and allocate an area in the unallocated area to the second virtual storage apparatus.

2. The computer according to claim 1, wherein
   upon receiving a setting request for configuring the size of the cache to a specific size, the processor is configured to determine whether or not the contiguous area having the specific size can be reserved on the basis of the area information, and
   when determination is made that the contiguous area having the specific size can be reserved, the processor is configured to select the contiguous area having the specific size from the memory on the basis of the area information.

3. The computer according to claim 2, wherein
   the processor is configured to allocate computing power of the processor to the plurality of processes, and the processor is configured to allocate a portion of the capacity of the memory to processes other than the cache from among the plurality of processes.

4. The computer according to claim 3, wherein
the processor is configured to configure the first area, which is a portion of the memory, to the OS,
the processor is configured to allocate areas in the first area to the plurality of processes, and
the processor is configured to select the contiguous area from the second area in the memory, the second area differing from the first area.

5. The computer according to claim 3, wherein
when determination is made that the contiguous area having the specific size cannot be reserved, the processor is configured to change, on the basis of the area information, an area allocated to a specific process among the plurality of processes, with this specific process being a process other than a virtual storage apparatus, to an area in the unallocated area of the memory, with this area having not been allocated to a process, whereby the contiguous area having the specific size is reserved.

6. The computer according to claim 5, wherein
when determination is made that the contiguous area having the specific size cannot be reserved, the processor is configured to select, on the basis of the area information, the area allocated to the specific process as a migration source area, select, on the basis of the area information, an area in the unallocated area as a migration destination area, copy data in the migration source area to the migration destination area, and change the area allocated to the specific process from the migration source area to the migration destination area, whereby the contiguous area having the specific size is reserved.

7. The computer according to claim 6, wherein
the processor is configured to pin down the contiguous area.

8. The computer according to claim 7, wherein
the area information indicates physical addresses of areas in the memory which are allocated to respective processes.

9. A control method for a computer including a memory, a processor coupled to the memory, a DMA controller which is coupled to the memory and the processor and is configured to perform transfer in accordance with a DMA transfer request from the processor, and a OS which is configured to be executed on the processor and execute a plurality of processes thereon, the control method comprising:
executing the plurality of processes of the OS involving a first virtual storage apparatus that executes 10 processing to a storage device;
transferring, from the DMA controller, data in which the first virtual storage apparatus performs 10,
virtualizing and allocating a first area of the memory to a plurality of processes including the first virtual storage apparatus and
allocating a physically contiguous area to a second area of the memory as a cache where the first virtual storage apparatus and the DMA controller store and exchange data of the IQ;

wherein
one of the plurality of processor is a second virtual storage apparatus,
the processor is configured to determine, when determination is made that the contiguous area having the specific size cannot be reserved, whether or not the size of an unallocated area of the second area is equal to or greater than the specific size, with this unallocated area having not been allocated to the first virtual storage apparatus, and
when determination is made that the size of the unallocated area is equal to or greater than the specific size, the processor is configured to:
change a specific area of the second area to an area in the unallocated area, with this specific area being allocated to the second virtual storage apparatus, thereby reserving the contiguous area having the specific size;

and
convert data in the specific area to a clean state, deallocate the specific area, and allocate an area in the unallocated area to the second virtual storage apparatus.

* * * * *